United States Patent [19]

Schonbrun et al.

[11] 3,940,569

[45] Feb. 24, 1976

[54] PROGRAMMABLE TOLL RESTRICTOR

[75] Inventors: Leslie B. Schonbrun, Port Washington; Friedrich W. Schwaar, West Islip, both of N.Y.

[73] Assignee: E & M Communications Corporation, New York, N.Y.

[22] Filed: Aug. 8, 1973

[21] Appl. No.: 386,620

[52] U.S. Cl. ........................ 179/18 DA; 179/27 CB
[51] Int. Cl.² .......................................... H04M 3/38
[58] Field of Search .......... 179/18 DA, 27 CB, 18 D

[56] References Cited
UNITED STATES PATENTS

| | | | |
|---|---|---|---|
| 3,692,951 | 9/1972 | Hestad et al. | 179/27 CB |
| 3,784,757 | 1/1974 | Woolf | 179/18 DA |

*Primary Examiner*—William C. Cooper
*Assistant Examiner*—C. T. Bartz
*Attorney, Agent, or Firm*—Wolder & Gross

[57] ABSTRACT

A toll restrictor for use in determining whether attempts to complete a trunk call are unrestricted is responsive to at least a first successively dialed three digit code of the call from the trunk to provide a control signal in response to this code being a restricted code to prevent the completion of the call having this code. The restrictor includes a registration portion which comprises relay means responsive to the dialed digits for initially registering the first two successively dialed digits of the code as a first tens digit group and the last successively dialed digit of the code as a second ones digit group. The first tens digit group enables the provision of a family of ten three digit codes having a common first two dialed digits. The registration portion also comprises second relay means responsive to at least the first tens digit group for providing the control signal when at least the tens digit group indicates a restricted three digit code. Only a portion of the three digit codes in a family of such codes can be restricted by the interposition of a relay means, such as a reed relay means; which is operable in response to the provision of at least one unrestricted three digit code in a restricted family of such codes to prevent the operation of the second relay means when the reed relay means is operated. The toll restrictor may also include means operatively connected to the first relay means which are responsive to the first provided digit being a predetermined digit, such as a unique long distance access code, for resetting the toll restrictor to the initial state thereof in response thereto.

14 Claims, 3 Drawing Figures

PROGRAMMABLE TOLL RESTRICTOR

BACKGROUND OF THE INVENTION

1. Field of the Invention

The present invention relates to toll restrictors for use in determining whether attempts to complete a trunk call are unrestricted and for preventing the completion of a call having a restricted code.

2. Description of the Prior Art

Toll restrictors are well known in the art, such as toll restrictors which recognize any three digit code. An example of such prior art toll restrictors is disclosed in U.S. Pat. Nos. 3,692,951; 3,736,383; 3,014,989 and 2,916,555. However, these prior art toll restrictors are complex and require a large quantity of relays, such as a cascade arrangement of the type disclosed in U.S. Pat. No. 3,692,951, wherein 120 relays or the equivalent thereof may be required. Such a complex arrangement is costly, inefficient and introduces a greater likelihood of failure due to the large number of components involved. Prior art toll restrictors which are responsive to a three digit code, normally consider each digit in the three digit code separately thus requiring the large number of relays previously mentioned in order to handle all possible combinations. Furthermore, such prior art toll restrictors cannot readily and simply be modified to provide all possible restriction combinations, such as one code in a group of three digit codes having the same first two digits being unrestricted or more than one code in such a group, but less than all, being unrestricted. These disadvantages of the prior art are overcome by the present invention.

SUMMARY OF THE INVENTION

A toll restrictor for use in determining whether attempts to complete a trunk call are unrestricted is provided. The toll restrictor is responsive to at least a first successively dialed three digit code of the call from the trunk to provide a control signal in response to the first dialed three digit code being a restricted code to prevent the completion of a call having the first dialed three digit code. The toll restrictor comprises a digit registration portion and means, such as a binary counting chain portion, responsive to dial pulses associated with each of the dialed digits in the code for successively individually providing the dialed digits, such as the binary equivalents thereof, to the registration portion for registration of the dialed digits. The dialed digits are successively individually provided to the counting chain one at a time.

The registration portion comprises first relay means responsive to the provided digits for initially registering the first two successively dialed digits of the first dialed three digit code as a first tens digit group and the last successively dialed digit of the first dialed three digit code as a second one digit group. The first tens digit group enables the provision of a family of ten three digit codes having a common first two dialed digits. The registration portion also comprises second relay means responsive to at least the first tens digit group for providing the control signal when at least the tens digit group indicates a restricted three digit code.

The binary counting chain provides binary equivalents of the dialed digits to the registration portion, and the registrations portion further comprises binary-to-decimal conversion chain means responsive to the first two dialed digit binary equivalents. The first relay means comprises a plurality of tens relay means, each tens relay means providing a different family of tens digit groups having a different common first digit, operatively connected to the binary-to-decimal conversion chain for providing the first tens digit group in response thereto.

The registration portion may also include relay means such as reed relay means, operatively connected in parallel between the conversion chain means output and at least one of the plurality of tens relay means associated with a restricted code, which reed relay operates in response to the provision of at least one unrestricted three digit code in a restricted family of ten three digit codes having a common first two dialed digits provided by the tens relay means. The second relay means is operated when the restricted dialed code comprises the first tens digit group associated with this tens relay except when the reed relay is operated whereby only a portion of the three digit codes in a family of three digit codes having a common first two digits may be restricted.

In addition, the toll restrictor, which has an initial state prior to the provision of the first successively dialed digit thereto, may also include in the registration portion thereof, means operatively connected to the first relay means responsive to the first successively dialed digit of the first two digits being a predetermined digit, such as a unique long distance access code, for resetting the toll restrictor to the initial state in response thereto.

BRIEF DESCRIPTION OF DRAWING

FIGS. 1, 2 and 3 taken together forming the composite detached type schematic of the preferred embodiment of the toll restrictor of the present invention, wherein an " x " indicates a normally open contact which closes or makes when the relay is energized or operated and a " + " indicates a normally closed contact which opens or breaks when the relay is energized or operated.

DETAILED DESCRIPTION OF THE PREFERRED EMBODIMENT

Figure 1:
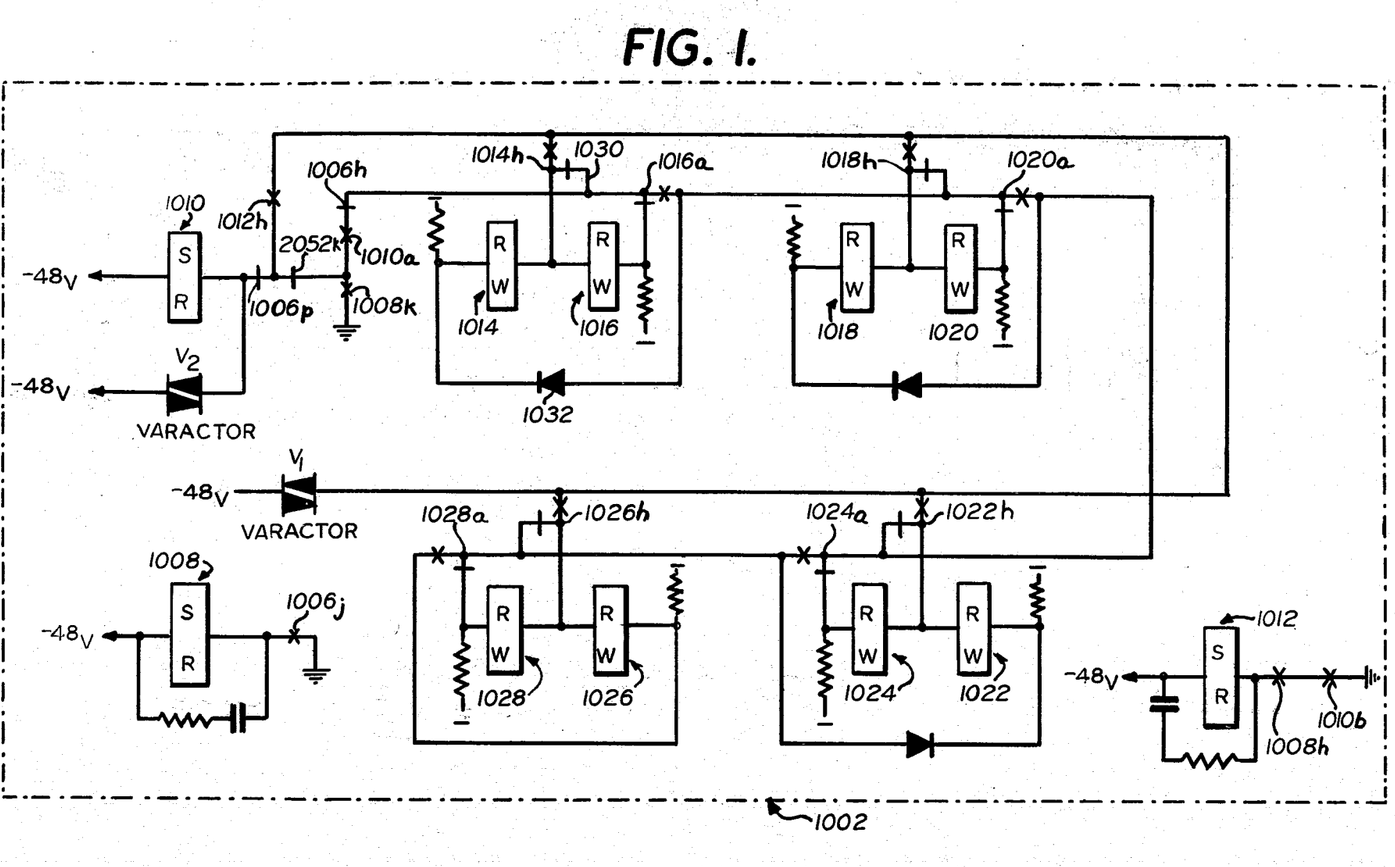
FIG. 1 is a portion of a detached type schematic of the preferred embodiment of the present invention showing the binary counting chain portion thereof.
Figure 2:
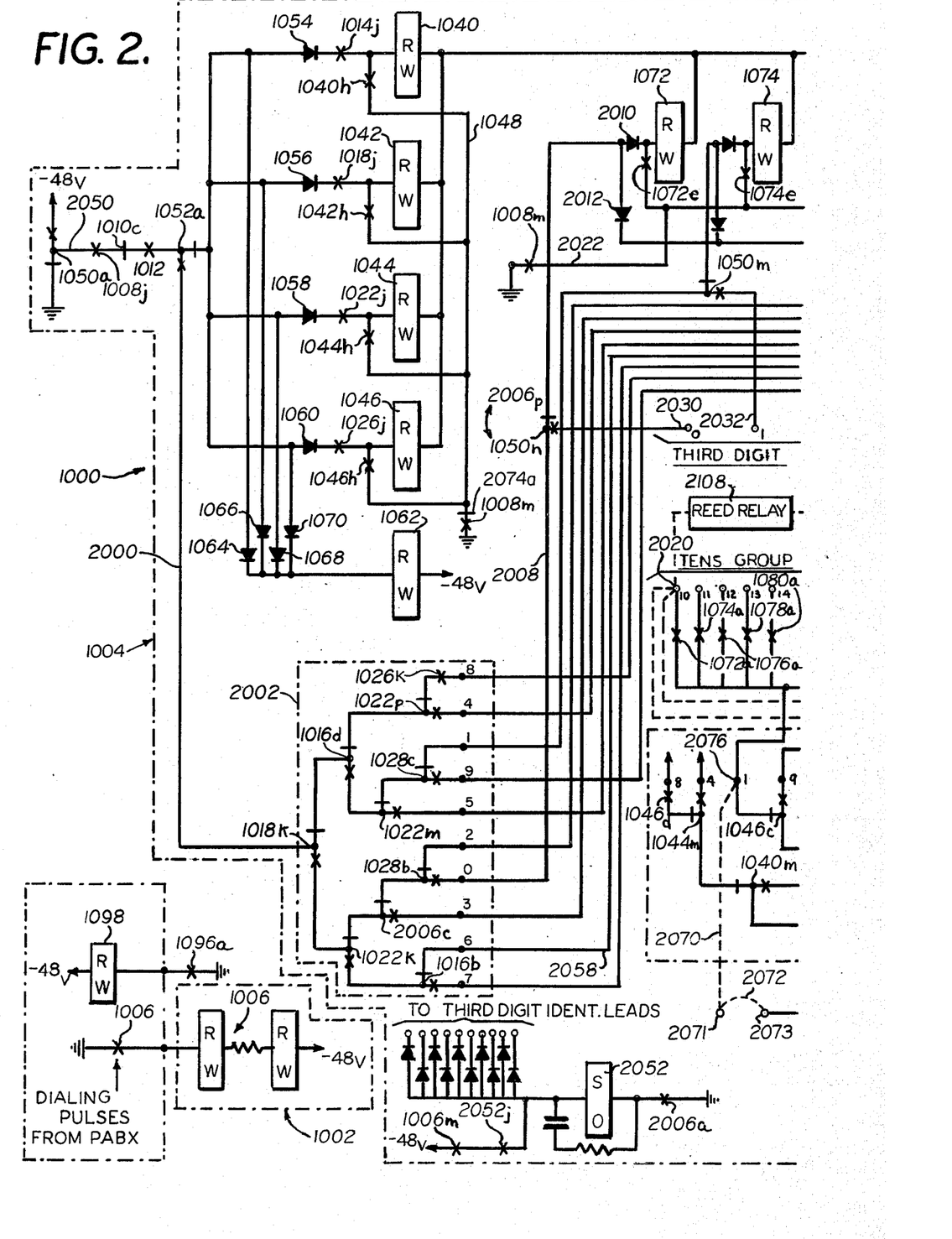
FIGS. 2 and 3 when taken together from another portion of a detached type schematic of the preferred embodiment of the toll restrictor of the present invention, showing the registration portion thereof.
Figure 3:
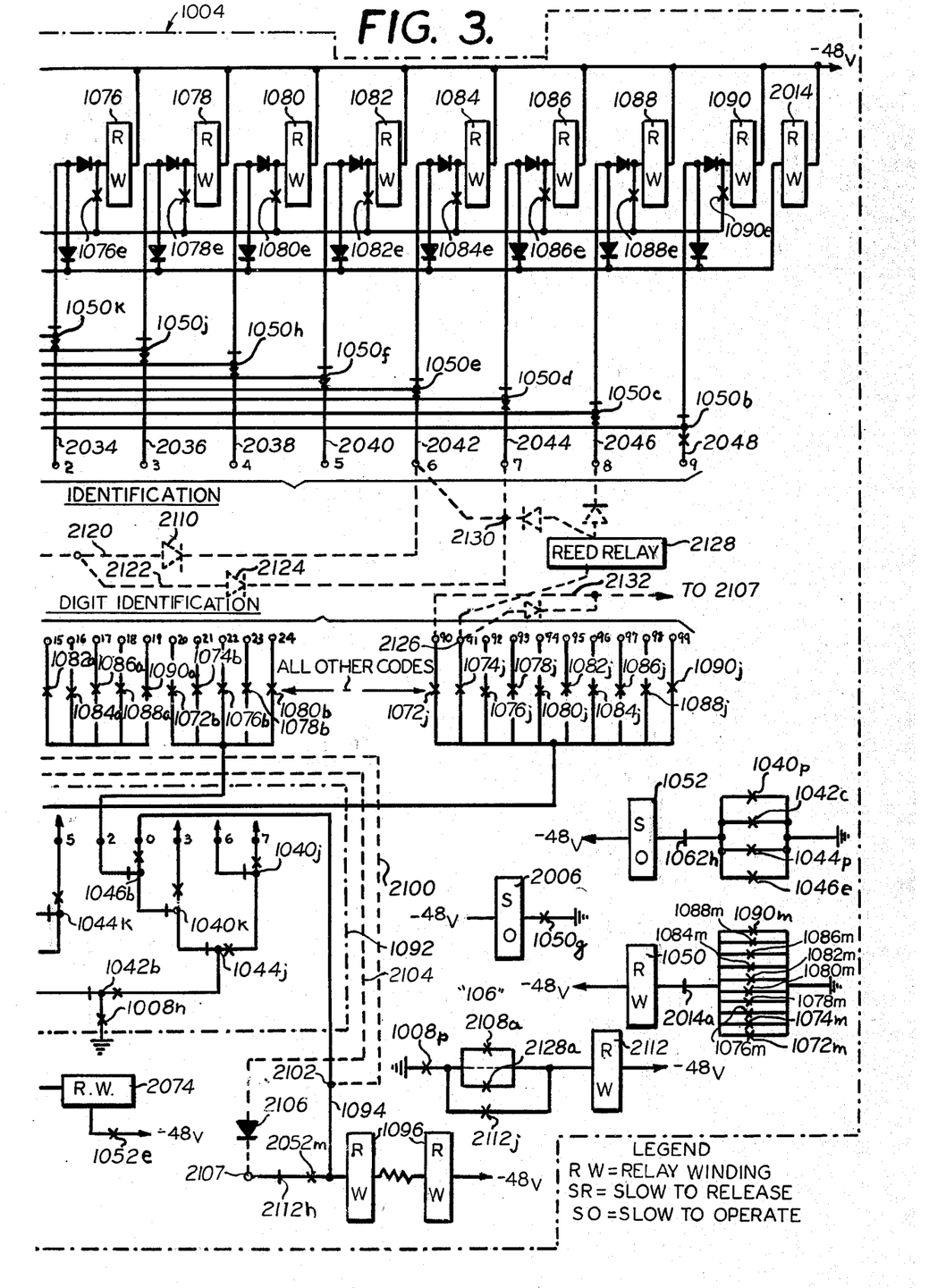

Referring now to the drawings in detail, FIGS. 1, 2 and 3, taken together forming a composite detached type schematic of the preferred toll restrictor of the present invention, generally referred to by the reference numeral 1000, the toll restrictor 1000 preferably includes a binary counting chain portion 1,002, which is preferably a conventional binary counting circuit which is responsive to dial pulses associated with the successively dialed digits of a call, such as preferably the first three digits thereof, for providing a binary equivalent thereof, and a registration portion 1004 for registration of these dialed digits and the provision of a control signal in response to the first dialed three digit code from a trunk (not shown) being a restricted code to prevent the completion of a call having this first dialed three digit code. It should be noted that as used herein throughout the specification and claims, the term "dialed digits" is meant to include a Touch-Tone (Trademark) input as well as conventional rotary dial input to the counting chain portion 1002.

In the detached schematic of FIGS. 1, 2 and 3, each rectangle represents a single coil or relay winding (R.W.) of an associated relay and an " x " represents a normally open or make contact of the relay identified by the same number as the relay followed by a letter $a,b,c,d,e,f,g,h,j,k,m,n$, and p, each letter representing a different contact by way of example for that relay. Similarly, a " $+$ " represents a normally closed or break contact of that relay and is identified in the same fashion as described above with respect to a normally closed contact. Additionally, make and break contacts formed by the same contacts of a relay are indicated by a reference character drawn to the junction of the contacts. For example, the reference character 1050*m* drawn to a junction of such contacts designates that the normally closed contacts adjacent the junction will open and the normally open contacts adjacent the junction will close when relay winding 1050 is energized. Furthermore, those relays that have the symbol "S.R." within the rectangle are preferably a conventional slow to release relays whose release time is set by an RC time constant in conventional fashion, and those having the symbol "S.O." are preferably conventional slow to operate relays. All of the relays described hereinafter are preferably conventional relays, such as wire spring, Western Electric type relays, or reed relays, or any other satisfactory conventional relay which functions in the manner to be described in greater detail hereinafter, those relays not being indicated as slow release relays or slow to operate relays, being conventional relays having a normal operating release time, such as on the order of 25 milliseconds versus 300 milliseconds for a slow to release relay.

The binary counting circuit 1002 preferably comprises twelve relays 1006, 1008, 1010, 1012, 1014, 1016, 1018, 1020, 1022, 1024, 1026, and 1028, with all these relays preferably being single winding relays except for relay 1006 which has two windings. Preferably, the pulsing relay of the register or trunk circuit (not shown) is connected via a pulsing contact to relay 1006 of the toll restrictor 1000. Relay 1006 is the pulse relay and preferably follows the dialed pulses of the telephone instrument (not shown). Relay 1008, which is preferably a slow to release relay, is actuated by relay 1006 and does not release during dial pulses. Relay 1010, which is also preferably a slow to release relay, follows relay 1006 inversely, operating when relay 1006 releases and releasing slowly when relay 1006 operates. Relay 1012, which is also preferably a conventional slow to release relay, operates auxiliarly to relay 1010 and releases slightly after relay 1010 due to its slow to release nature. Relays 1014, 1016, 1018, 1,020, 1022, 1024, 1026 and 1028 count and hold the dialed information in conventional fashion as follows. After the first dial pulse, relays 1014 and 1016 are operated. After the second pulse, relays 1014 and 1016 are released and relays 1018 and 1020 are operated. After the third pulse, relays 1014 and 1016 are operated and relays 1018 and 1020 remain operated. After the fourth pulse, relays 1014, 1016, 1018 and 1020 are released and relays 1022 and 1024 are operated. After the fifth pulse, relays 1014 and 1016 are operated and relays 1022 and 1024 remain operated. After the sixth pulse, relays 1014 and 1016 are released and relays 1018 and 1020 are operated and relays 1022 and 1024 remain operated. After the seventh pulse, relays 1014 and 1016 are operated and relays 1018, 1020, 1022 and 1024 remain operated. After the eighth pulse, relays 1014, 1016, 1018, 1020, 1022, and 1024 are released and relays 1026 and 1028 are operated. After the ninth pulse, relays 1014 and 1016 are operated and relays 1026 and 1028 remain operated. Finally, after the tenth pulse, relays 1014 and 1016 are released, relays 1018 and 1020 are operated, and relays 1026 and 1028 remain operated. The above discussion is summarized in the following chart which shows the manner in which the relays 1014 through 1028 inclusive, count and hold the dialed information, an X indicating an operated relay.

| COUNTING CHAIN | | | | |
|---|---|---|---|---|
| | Relays Operated | | | |
| | 1014,1016 | 1018,1020 | 1022,1024 | 1026,1028 |
| After first pulse | x | | | |
| After second pulse | | x | | |
| After third pulse | x | x | | |
| After fourth pulse | | | x | |
| After fifth pulse | x | | x | |
| After sixth pulse | | x | x | |
| After seventh pulse | x | x | x | |
| After eighth pulse | | | | x |
| After ninth pulse | x | | | x |
| After tenth pulse | | x | | x |

The above chart illustrates a conventional operating scheme for the counting chain and is given by way of example and not by way of limitation.

The operation of the pulsing circuit or counting chain 1002 is as follows. Relay 1006 releasing operates relay 1010. Relay 1010 in turn operates relay 1012. During the time that relay 1010 is operated and relay 1006 is released, a ground is passed through the normal 1014h contact to operate relay 1014. A ground to contact 1012h of relay 1012 is waiting to form a holding path for relay 1014 and relay 1016 through a relay contact 1014h operated via path 1030. Relay 1016 does not operate at this time because of the shunting ground through contact 1016*a* normal. As relay 1006 re-operates completing the first pulse, the shunting ground is removed from relay 1016 and it operates through relay contact 1014h operated and relay contact 1012h operated. Therefore, at the end of the first dial pulse, relay 1014, and 1016 are operated and will remain so until relay 1012 releases.

If a second successively dialed pulse were now to follow, during the period when relay 1006 is released and relay 1010 is operated, a ground would be passed through the operated 1016*a* relay contact, operating relay 1018 through contact 1018h normal and at the same time would shunt relay 1014 through a conventional shunting diode 1032 connected to the relay coil of relay 1014. Relay 1018 would hold to the ground on contact 1018h operated through contact 1012h operated. Relay 1020 is shunted at this time in exactly the same manner as previously described with reference to relay 1016. When relay 1006 re-operates for the end of the second pulse, relay 1016 will have fallen down through the loss of its holding path via relay contact 1014h and relay 1020 will operate through relay contact 1018h operated now that its shunting ground has been removed.

At the next dial pulse, relay 1014 and relay 1016 will re-operate in the manner previously described, and, therefore, at the end of this third pulse, relays 1014, 1016, 1018 and 1020 will remain operated. The fourth pulse will shunt down relays 1014, 1016, 1018 and 1020 in the manner previously described with reference to the shunting of relays 1014 and 1016 after the second pulse, and operate relays 1022 and 1024 in the same manner as previously described with reference to relays 1018 and 1020. The course of the operation and the position of these relays 1014 through 1028, inclusive, at the end of each pulse, is illustrated in the above chart.

Referring now to FIGS. 2 and 3, the registration portion 1004 of the toll restrictor 1000 is shown. At the end of a dialed digit, the counting chain 1002 is in the following position. Relay 1010 is released and relay 1012 is operated along with thr group of counting relays 1014 through 1028, inclusive, which correspond to the number of pulses representing the digit dialed. For example, if the digit dialed is a 6 represented by 6 pulses, at the end of the dialed digit relays 1018, 1020, 1022 and 1024 of the counting relays will be operated. The registration portion 1004 preferably includes a relay configuration comprising relays 1040, 1042, 1044 and 1046, which are all preferably single coil relays, which temporarily store the dialed digit information in a binary manner. When one or more of these relays 1040 through 1046, inclusive, is operated it preferably remains operated through its own holding contact, contact 2074a of relay 2074 and a contact 1008m of relay 1008 to ground via path 1048, relays 1040, 1042, 1044 and 1046 being connected in parallel through their respective holding contacts 1040h, 1042h, 1044h, and 1046h.

The first digit dialed is registered by a ground being passed through relay contact 1050a normal of a relay 1050, whose function is to be described in greater detail hereinafter with reference to the operation of the registration portion 1004, 1008j operated, normal 1010c normal, 1012k operated, relay contact 1052a of another single coil relay 1052 which is preferably a slow to operate relay forming part of registration portion 1004 and whose operation will be discussed in greater detail hereinafter, through one or more operated contacts 1014j, 1018j, 1022j, or 1026j of relays 1014, 1018, 1022, 1026 of counting chain 1002 depending on which of these relays has been operated at this time in response to the pulse dialed digit. Which of these relays 1014, 1018, 1022 and 1026 is operated in forms the circuit which digit has actually been dialed as previously described. This first digit dialed operates one or more of the registration relays 1040, 1042, 1044 and 1046, depending on which of the relays 1014, 1018, 1022 and 1026 has been operated, in order to temporarily store this information in a binary manner within the appropriate relay configuration 1040 through 1046, inclusive. Conventional isolation diodes 1054, 1056, 1058, and 1060 are provided in the input path to the relay configuration 1040, 1042, 1044, 1046, respectively. As was previously mentioned, relays 1040 through 1046, inclusive, remain operated through their respective holding contacts 1040h through 1046h, respectively, through a ground through relay contacts 2074a of relay 2074 and 1008m of relay 1008. As will be described in greater detail hereinafter, when the toll restrictor 1000 is ultimately released at the end of the call, relay 1008 releases and, in turn, through path 1048, releases relays 1040, 1042, 1044 and 1046.

Registration portion 1004 also preferably includes another single winding relay 1062 which is preferably connected in parallel to relays 1040, 1042, 1044 and 1046 through conventional isolation diodes 1064, 1066, 1068 and 1070, respectively. The same ground that operates one or more of the registration relays 1040 through 1046, inclusive preferably operates relay 1062. This relay 1062 opens the path for the operation of transfer relay 1052 until after the first digit actuating ground is removed. At this point, relay 1062 releases and relay 1052 operates through an operated contact of one or more of the registration relays 1040 through 1046, inclusive, depending on which of these relays has been operated in accordance with the value of the first dialed digit, as was previously mentioned. Transfer relay 1052 is preferably a slow to operate relay. This is preferably to insure that only the registration relays 1040 through 1046, inclusive, are operated by the first digit actuating ground.

The operation of relay 1052 preferably transfers the registration leads from the registration relays 1040 through 1046, inclusive to a plurality of tens relays 1072, 1074, 1076, 1078, 1080, 1082, 1084, 1086, 1088, and 1090, which also form part of the registration portion 1004, to register the second dialed or tens digit in the manner to be described in greater detail hereinafter.

Relay 1012 of the counting chain, as was previously mentioned, is preferably a slow to release relay so that after relay 1010 has released, relay 1012 subsequently releases after a predetermined time interval, such as 300 milliseconds. At the end of this time, the counting chain 1002 is released to its initial state and is ready for receipt of a new digit and the previously dialed digit is temporaruly stored in the registration relay configuration 1040, 1042, 1044, and 1046, as previously described.

At the end of this first dialed digit, relay 1008 has been operated, as previously described, and a ground is passed through relay contact 1008n of relay 1008 through a conventional binary-to-decimal conversion chain 1092 which converts the binary equivalent of the dialed digit into its decimal equivalent, and a ground is provided on one and only one of the outputs of this binary-to-decimal conversion chain 1092, indicated by the symbols 0 to 9 corresponding to the respective digits, corresponding to the decimal equivalent of the dialed digit. This ground point at the selected output of the binary-to-decimal conversion chain 1092 is preferably carried forward to one contact of each of the tens relays 1072 to 1090, inclusive, to be utilized subsequently as described in greater detail hereinafter. The particular contact to which this ground has been carried forward depends on the value of the first dialed digit. For example, if this digit is a one, then this ground is carried forward in parallel, as shown in FIGS. 2 and 3, to contacts 1072a through 1090a, inclusive, of tens relays 1072 through 1090, inclusive, respectively. Similarly, if this first digit is a nine, then this ground would be carried forward in parallel to contacts 1072j through 1090j, inclusive, of tens relays 1072 through 1090, inclusive, respectively, and similarly to contacts b,c,d,e,f,g, and h for tens relays 1072 through 1090, inclusive, if the first digit dialed is a 2,3,4,5,6,7, or 8, respectively. Accordingly, at this point, there is a ground sitting on a multiplie of ten contacts, one from each of the tens relay 1072 through 1090 inclusive, through the binary-to-decimal conversion chain 1092 through relay contact 1008n.

With respect to the 0 digit output of conversion chain 1092, this output is connected via a path 1094 to another relay 1096, which is preferably a two winding relay. Relay 1096, which is the control signal providing relay, in operating passes a control signal through its contact 1096a to the equipment attached to the toll restrictor 1000, indicating that a restricted code has been dialed, release the call. For example, as illustrated in FIGS. 2 and 3, if the toll restrictor 1000 is attached to a register, the control signal will be passed to a conventional release relay 1098 of the register. The purpose of the connection path 1094 to the 0 digit output of the binary-to-decimal conversion chain 1092 is that it is presently preferred that the call be restricted if a 0 is dialed as the first digit so that the operator cannot be reached to circumvent the toll restrictor 1000. Thus, when a 0 is the first dialed digit, the ground will be passed via path 1094 to relay 1096 which will then operate. However, if it is desired to permit the toll restrictor 1000 permit calls with a 0 as the first dialed digit, then this connection path 1094 may be omitted. Furthermore, if it is desired to restrict any other first dialed digit, then a path similar to path 1094 may be provided from that digit output of conversion chain 1092 to relay 1096.

At the same time that the registration relay configuration 1040 through 1046, inclusive is operated through the unoperated relay 1010 and the operated relay 1012, relay 1062 operates. When one or more of the registration relays 1040 through 1046, inclusive operates, ground is passed to the winding of relay 1052, as previously mentioned, which is a slow to operate relay, which ground would normally operate relay 1052 in approximately 100 milliseconds, by way of example, however, relay 1062 operating at the same time as the relay configuration 1040 through 1046, inclusive opens this path and, therefore, does not allow relay 1052 to operate until such time as relay configuration 1040 through 1046 remains operated and relay 1062 returns to its normally unoperated state. This takes place when relay 1012 releases, releasing the digit registration ground from the input to the registration relays 1040 to 1046, inclusive. At this time, relay 1052 operates slowly and transfers the path of the digit registration ground from the relay configuration 1040 through 1046, via path 2000 to another binary-to-decimal conversion chain 2002, which is a conventional binary-to-decimal conversion chain similar to conversion chain 1092, with the symbols 0 to 9 indicating the decimal equivalent of the binary digits supplied thereto, this chain 2002 converting the binary input into a decimal output in conventional fashion, this conversion chain 2002 being connected through a normally closed or non-operated contact 1050b, 1050c, 1050d, 1050e, 1050f, 1050h, 1050j, 1050k, 1050m, and 1050n of relay 1050 to the respective tens relays 1090, 1088, 1086, 1084, 1082, 1080, 1078, 1076, 1074, 1072, respectively. At the end of the second dialed digit, a ground is passed through the again normally closed relay 1010 contact and the operated relay 1012 contact and the now operated relay 1052a contact to the binary-to-decimal conversion chain 2002 which operates one of the tens relays 1072 through 1090, inclusive, depending on which digit has been dialed. For example, if a 0 has been dialed as a second digit, the ground is passed through 1018k operated, 1022k normal, 2006c normal, 1028b operated, via path 2008, through 1050n normal through diode 2010 to the relay winding of tens relay 1072. At the same time, this ground also preferably goes through diode 2012 and operates another relay 2014 which is also preferably a single winding relay to which all of the tens second successively dialed digit was a o, 1072 through 1090, inclusive, are all preferably connected in parallel. When one of the tens relays 1072 through 1090, inclusive, operates, relay 1072 being utilized in the example, the ground which was left sitting at one contact of each of these relays 1072 to 1090, which ground was provided from conversion chain 1092 in response to the first dialed digit, is now passed through to a terminal point and indicates the identity of the first two successively dialed digits that have been dialed as a tens group. For example, if the first digit dialed was a 1 and the second successively dialed digit was o, there would be a ground through relay contact 1008n operated, relay contact 1042b normal, relay contact 1040m operated, relay contact 1044k normal, relay contact 1046c normal, to contact one of each of the tens relays 1072 through 1090, inclusive. In the example given, when relay 1072 operates, the ground is passed through to terminal point 2020, also designated by the symbol 1-0, which would indicate that the tens group which has been dialed is 1-0. The tens relay that has been operated, 1072 in the example given, holds through its own contact through contact 1008m via path 2022 to ground and will only release, preferably, when the toll restrictor 1000 is subsequently released. When any of the tens relays 1072 through 1090, inclusive, is operating, relay 2014 is also operating. Ground is passed through operated contact 1072m, in the example given, of operated tens relay 1072 through a normally closed contact 2014a of relay 2014 to the relay winding of relay 1050. Relay 1050 is preferably not a slow to operate relay; however, relay 1050 generally cannot operate, preferably, until relay 2014 has released. The releasing of relay 2014 indicates the completion of the second dialed digit information. Relays 1062 and 2014 are preferably guard relays to insure that the transfer relay 1052 or 1050 does not operate before the end of the digit transmission period to insure that only one digit is registered for each digit registration period. The operation of relay 1050 first causes a change from ground to battery on path 2050 via operated contact 1050a in preparation for the third dialed digit. Relay 1050 when operated, transfers the outputs of the binary-to-decimal conversion chain 2002 to the third digit identification leads 2030 through 2048, inclusive, as previously mentioned, through operated contacts 1050n, 1050m, 1050k, 1050j, 1050h, 1050f, 1050e, 1050d, 1050c, and 1050b, respectively, from tens relays 1072 through 1090, inclusive. In addition, relay 1050 operates relay 2006 through operated relay contact 1050g. Relay 2006 is preferably a slow to operate relay similar to relay 1052. The operation of relay 2006 preferably enables another relay 2052, which is also preferably a single winding slow to operate relay, by providing a ground through operated relay contact 2006a of relay 2006 so as to pass through a ground to one side of the winding of relay 2052. Since this ground is only provided after relay 1050 operates, relay 2052 can never operate until the third digit is dialed.

When the third successively dialed digit is dialed, supplied to the counting chain 1002 and therefrom, provided to the registration portion 1004, a battery is provided via path 2050, relay 1050 having switched from ground to battery, through relay contact 1052a operated, via path 2000 to binary-to-decimal conversion chain 2002, through the appropriate relay contact 1050n, 1050m, 1050k, 1050j, 1050h, 1050f, 1050e, 1050d, 1050c, 1050b, operated to the appropriate point on the third digit identification leads 2030 through 2048, inclusive. For example, if the third dialed digit is a 6, then the path through the binary-to-decimal conversion chain 2002 to the appropriate third digit identification lead 2042, in the example given, would be as follows. From path 2000, through 1018k operated, 1022k operated, 1016b normal, via path 2058, through contact 1050e operated to path or lead 2042. At the same time, the battery present on path 2050 starts to operate relay 2052, which, as previously mentioned, is a slow-to-operate relay, so that at the end of the third digit transmission, relay 2052 will operate, indicating that the last registered digit has been received. If no strapping or connection has been provided between the tens group lead or path, such as path 2020, and the third or ones digit lead or path, for example path 2042 in the example given, then this three digit code would be an unrestricted code, relay 2052 would operate, and relay 2052 in operating would hold through its own contact 2052j and would disable the counting chain through contact 2052 k from counting any further digits.

If desired, the circuit may be modified so as to return to its initial state when a predetermined digit, such as a long distance access code, such as the digit 1, is dialed as the first digit. The toll restrictor 1000 is normally in this initial state prior to the provision of a three digit code thereto, such as an area code or telephone exchange. Presently, a long distance access code is utilized in certain areas of the United States, such as the digit one, which preceds the dialing of the area code. There are presently no exchanges or area codes beginning with the digit one so that this is presently a unique first digit situation. However, it will be apparent to one of ordinary skill in the art, that the modification to be described in greater detail hereinafter may be utilized for any digit or plurality of digits desired. For example, let us assume that the one digit is utilized for long distance access and, it is desired to initialize or return the toll restrictor 1000 to its initial state whenever a one is dialed as the first digit. Accordingly, a wire 2070 is preferably provided to a first connector terminal 2071 and a jumper 2072 is provided to a second connector terminal 2073 which is preferably connected to another conventional single winding relay 2074. Terminals 2071 and 2073 are provided by way of illustration so as to indicate that jumper 2072 may be removed if it is not desired to have toll restrictor 1000 to return to its initial state when a one is dialed as the first digit. Of course, if desired this option need not be provided and path 2070, terminals 2071 and 2073, jumper 2072 and relay 2074 may be omitted. In the example given, if a one is dialed as the first digit, a ground will be present at output point 2076 as previously mentioned. This ground will prepare relay 2074 for operation when relay 1052 operates, which occurs after the first dialed digit in the manner previously described. When relay 1052 operates, relay 2074 is connected to battery through operated contact 1052e. Relay 1074 operates and through contact 2074a knocks down all of the registration relays 1040 through 1046, inclusive which have been operated which, in turn, releases relay 1052 and the toll restrictor 1000 has then been reset to its initial state so as to recognize the first dialed digit again.

As will be explained in greater detail hereinafter, the preferred toll restrictor 1000 of the present invention is capable of providing various restriction possibilities with respect to a given family of three digit codes having a common tens digit group; that is, the first two successively dialed digits being common for ten three digit codes, such as 100 through 109 or 910 through 919. These restriction posibilities are preferably that the entire group is restricted, that is all the three digit codes in the family of ten three digit codes in a common tens digit group; only one three digit code in the group is unrestricted with the balance of the codes being restricted; or more than one code but less than all the codes in the group are unrestricted. All of these restriction possibilities are shown by way of example in FIGS. 2 and 3. However, it is of course obvious that mutually exclusive possibilities cannot be present at the same time, such as a connection which enables the entire group to be restricted and a connection which enables less than the entire group to be restricted; however, both such connections are shown in FIGS. 2 and 3 for purposes of illustration, the user obviously omitting the connection not desired.

The first restriction possibility to be discussed is a situation in which the entire tens digit group of ten codes, for example, the 1–0 group, is to be restricted independent of the third digit. In this instance, where the entire group is restricted, a strap or connection 2100 is preferably placed from terminal point 2020 corresponding to the 1-0 tens group to a point 2102 connected to path 1094. At the end of the second successively dialed digit, the ground would be passed through to point 2020 in the manner previously described, and this ground would be passed through strap 2100 to point 2102 and, via path 1094 to relay 1096 which would then operate. Relay 1096 in operating passes a control signal through its contact 1096a to the equipment attached to the toll restrictor 1000, indicating a restricted code has been dialed, release the call. As previously mentioned, in the example shown, if the restrictor 1000 is attached to a register, this signal will be passed to the release relay 1098 of the register.

In the next two restriction possibilites to be considered, that is where only one code in the tens digit group is unrestricted or where more than one code but less than all the codes in the group are unrestricted, it is to assumed that strap 2100 has been omitted. First, considering the restriction possibility wherein only one three digit code in the group or family of three digits codes having a common tens digit group, is unrestricted. By way of example, it shall be assumed that code 106 is to be unrestricted and all other codes in the 1-0 group are to be restricted. In such an instance, a strap or connection 2104 is connected from terminal point 2020 through a diode 2106 to a point 2107. A conventional reed relay 2108 is connected between terminal point 2020 on the tens digit group identification leads and lead 2042 corresponding to the digit 6 on the third digit identification leads. A diode 2110 is shown interposed between the reed relay 2108 and lead 2042. However, this diode, which is an isolation diode, is preferably omitted in the instance where only one strapping connection is made to third digit lead 2042, isolation diode 2110 being utilized when more than one such connection is made to this lead 2042, as in the instance where codes 106 and 107 are to be unrestricted, as will be described in greater detail hereinafter. When diode 2110 is omitted, a direct connection is provided from reed relay 2108 to lead 2042. At the end of the second successively dialed digit, as was previously described, a ground will be found at terminal point 2020. This ground is passed through strap 2104 and diode 2106 to point 2107. Since relay 2052 is not operated at this time, ground remains at point 2107 and does not operate relay 1096 at this time. At the end of the third digit, battery is found on one of the leads 2030 through 2048, inclusive, of the third digit identification leads. In the example given, if the third digit dialed is not a six; that is, if battery is not found on lead 2042, reed relay 2108 does not operate; However, relay 2052 operates from that battery, as previously described. When relay 2052 operates, it passes the ground found on point 2107 through to relay 1096 indicating a restricted code and, as previously discussed a control or release signal is passed to the associated equipment to release the call. If, however, in the example given, a six is dialed as the third digit so as to provide the unrestricted code 106 as the dialed code, the operation will be as described above with respect to the first two digits 1 and 0 of the tens digit group. However with respect to the dialing of the six as the third digit, battery will be found on lead 2042 which will cause reed relay 2108 to operate while at the same time starting slow to operate relay 2052 to operate. Relay 2108 in operating, passes a ground through its operated contact to the winding of another conventional single winding relay 2112 and causes relay 2112 to operate. Relay 2112 preferably operates before slow to operate relay 2052 has had an opportunity to operate. This relay 2112 in operating, opens the path from point 2107 to the relay 1096 through contact 2052m which would have caused relay 1096 to operate. Relay 2112 holds and remains operated through its own holding contact 2112J. Shortly after, relay 2052 operates which, through contact 2052k, disables the counting chain 1002 from counting any further digits and the restrictor 1000 has completed its operation.

If the release or control signal from the restrictor 1000 is to be transferred to a register, then the restrictor 1000 would preferably immediately be taken off line; however, if the restrictor 1000 is attached directly to a trunk circuit, then the restrictor 1000 preferably would not be taken off line until the call was completed, or its function had been completed.

Now considering the possibility where more than one three digit code but less than all of the codes in the family of three digit codes having a common tens digit group is unrestricted, such as 106 and 107, by way of example. In this instance, strap 2104 through diode 2106 is once again connected between terminal point 2020 and point 2107. Reed relay 2108 is connected in parallel via path 2120 to third digit lead 2042 corresponding to the digit 6 in the illustration and via parallel path 2122 to third digit lead 2044 corresponding to the digit 7 in the illustration. The connection of reed relay 2108 via path 2120 is preferably through isolation diode 2110 and the connection of reed relay 2108 in parallel to lead 2044 via path 2122 is preferably through another isolation diode 2124. The operation of the circuit in this instance is as previously described above, with the exception that when either 106 or 107 is the dialed three digit code, then reed relay 2108 operates due to battery being present on lead 2042 or 2044, and indicates an unrestricted code, as previously described with respect to the operation of reed relay 2108 when only the code 106 was unrestricted. Diodes 2110 and 2124, as well as diode 2106, serve to isolate the selected code combinations from other three digit code combinations that may also be connected in the restrictor 1000. For example, if an addition to 106 and 107 being unrestricted codes, code 916 is to be unrestricted, there would be a common connection to lead 2042, the other connection being from terminal point 2126 corresponding to the tens digit group 9-1, through another conventional reed relay 2128, to lead 2042 corresponding to the digit 6 as the third digit, via connection 2130. If diodes 2110, 2124 and 2106 were not present to provide isolation, and, for example, the three digit code 917 were dialed, battery would be present on lead 2044 corresponding to the third digit 7, would go through strap 2122 to reed relay 2108, back on strap 2120 to point 2042, and via strap or connection 2130 to reed relay 2128 to operate this relay 2128 incorrectly, giving a false indication that code 917 was unrestricted. Therefore, the presence of diode 2110 in this instance would block this from happening.

FIGS. 2 and 3 also illustrate the instance where the entire 9-0 tens digit group is restricted via path 2132 in the same manner as the restriction of the entire 1-0 group previously described; as well as the instance where the code 918 is unrestricted in addition to code 917, which is accomplished in the same fashion as previously described with reference to codes 106 and 107 being unrestricted, isolation diodes similar to diodes 2110, 2124 and 2106 being utilized in this instance. Thus, any combination of restrictor and unrestricted codes can be accomplished in simple fashion through the interposition of reed relays and isolation diodes. Thus, by the use of a basic building block comprising a group of ten codes having the same tens digit group comprising the first two successively dialed digits, toll restriction may be accomplished in a simple and efficient manner to provide any desired combination of restriction possibilities.

It is to be understood that the above described embodiments of the invention are merely illustrative of the principles thereof and that numerous modifications and embodiments of the invention may be derived within the spirit and scope thereof.

What is claimed is:

1. A toll restrictor for use in determining whether attempts to complete a trunk call are unrestricted, said toll restrictor being responsive to at least a first successively dialed three digit code of said call from said trunk and providing a control signal in response to said first dialed three digit code being a restricted code to prevent the completion of a call having said first dialed three digit code, said toll restrictor comprising a binary counting chain portion and a digit registration portion, said binary counting chain being responsive to dial pulses associated with each of said dialed digits in said code for providing a binary equivalent thereof, said dialed digits being successively individually provided to said counting chain one at a time; said counting chain portion successively individually providing said dialed digit binary equivalents to said registration portion for registration of said dialed digits; and said registration portion comprising a first and a second binary to decimal converter means for converting said first and second dialed digit binary equivalents to respective first and second signals corresponding to the equivalent decimal digit, said second binary to decimal converter means being further operable to convert said third dialed digit binary equivalent to a third signal corresponding to the equivalent decimal digit, first relay means responsive to said first and second signals for initially registering the first two successively dialed digits of said first dialed three digit code as a first tens digit group and responsive to said third signal for registering said last successively dialed digit of said first dialed three digit code as a second ones digit group, said first tens digit group enabling the provision of a family of ten three digit codes having a common first two dialed digits, and second relay means responsive to at least said first tens digit group for providing said control signal when at least said tens digit group indicates a restricted three digit code.

2. A toll restrictor in accordance with claim 1 wherein said first relay means further comprises a registration relay chain storage means responsive to said counting chain provided dialed digit binary equivalents for temporarily storing at least said first two of said successively provided equivalents, said counting chain portion returning to its initial state after each provision of a dialed digit binary equivalent to said temporary storage means, said temporary storage means being operatively connected to the input of said conversion chain means for providing said first two dialed digit binary equivalents thereto.

3. A toll restrictor in accordance with claim 1 wherein said first relay means comprises a plurality of tens relay means, each tens relay means providing a different family of tens digit groups having a different common first digit.

4. A toll restrictor in accordance with claim 3, wherein said first binary to decimal converter means engages only one contact of each of said tens relay means in response to the provision of said first dialed digit of said code, said second binary to decimal conversion means responsive to the next provided successively dialed digit for operating only one of said engaged plurality of tens relay means depending on the identity of said provided second dialed digit, a different tens relay means being operated in response to the provision of a different second dialed digit, said operated tens relay means providing said first tens digit group.

5. A toll restrictor in accordance with claim 4 wherein said second relay means is operatively connected between said first and second binary to decimal converter means outputs to at least one of said plurality of tens relay means associated with a restricted code, said second relay means being operated when said restricted dialed three digit code comprises at least said first tens digit group associated with said one operated associated tens relay means, whereby said entire family of ten three digit codes having a common first two dialed digits is restricted.

6. A toll restrictor in accordance with claim 4 wherein said second relay means is operatively connected between said first and second conversion means outputs to at least one of said plurality of tens relay means associated with a restricted code, said registration portion further comprising third relay means operatively connected in parallel between at least one of said first and second conversion means outputs and said one tens relay means, said third relay means operating in response to the provision of at least one unrestricted three digit code in a restricted family of ten three digit codes having a common first two dialed digits provided by said one operated restricted code associated tens relay means, said second relay means being operated when said restricted dialed code comprises said first tens digit group associated with said one operated associated tens relay means except when said third relay means is operated, whereby only a portion of the three digit codes in a family of three digit codes having a common first two digits may be restricted.

7. A toll restrictor in accordance with claim 6 wherein isolation means are connected in parallel between said third relay means and each of the outputs of the second conversion means associated with an unrestricted code in said restricted family of codes for isolating said unrestricted codes from other codes connected in common to said second conversion means outputs.

8. A toll restrictor in accordance with claim 1 wherein said toll restrictor is in an initial state prior to the provision of the first successively dialed digit thereto, and said registration portion further comprises means operatively connected to said first relay means responsive to said first successively dialed digit of said first two digits being a predetermined digit for resetting said toll restrictor to said initial state in response thereto.

9. A toll restrictor in accordance with claim 8 wherein said predetermined digit is a unique long distance access code.

10. A toll restrictor in accordance with claim 9 wherein said predetermined digit is the number 1.

11. A toll restrictor in accordance with claim 1 wherein said toll restrictor is in an initial state prior to the provision of the first successively dialed digit thereto, and said registration portion further comprises means operatively connected to said conversion chain output responsive to said first successively dialed digit of said first two digits being a predetermined digit for resetting said toll restrictor to said initial state in response thereto.

12. A toll restrictor in accordance with claim 11 wherein said predetermined digit is a unique long distance access code.

13. A toll restrictor for use in determining whether attempts to complete a trunk call are unrestricted; said toll restrictor being responsive to at least one digit in a successively dialed three digit code of a call from said trunk to provide a control signal in response to said one digit in said first dialed three digit code being a restricted code to prevent the completion of a call having said one digit; said toll restrictor comprising binary counting means for sequentially encoding dialed decimal digits into corresponding binary signals; and a digit registration means for registering the dialed digits; said registration means comprising first converter means for converting the first binary encoded digit of said code into a first signal representative of the corresponding decimal digit, second converter means for converting the second and third binary encoded digits of said code into respective second and third signals representative of the corresponding second and third dialed decimal digits, and disable relay means responsive to at least said first signal for generating said control signal when said first signals indicates a restricted code.

14. A toll restrictor as in claim 13, in which said second converter means comprises a binary to decimal converter, and tens relay means connected to said binary to decimal converter responsive to said first and second signals for initially registering the first two successively dialed digits of said code as a first tens group signal, said disable relay means being responsive to at least a selected one of said tens group signal for generating said control signal.

* * * * *